US006647797B2

(12) United States Patent
Miodushevsky

(10) Patent No.: US 6,647,797 B2
(45) Date of Patent: Nov. 18, 2003

(54) STRAIN GAUGE STRIP AND APPLICATIONS THEREOF

(75) Inventor: Pavel Miodushevsky, Moscow (RU)

(73) Assignee: Powerco, S.p.A., Brindisi (IT)

( * ) Notice: Subject to any disclaimer, the term of this patent is extended or adjusted under 35 U.S.C. 154(b) by 0 days.

(21) Appl. No.: 10/158,552

(22) Filed: May 29, 2002

(65) Prior Publication Data

US 2003/0061884 A1 Apr. 3, 2003

(51) Int. Cl.$^7$ .............................................. G01L 17/16
(52) U.S. Cl. ................................. 73/774; 73/862.637
(58) Field of Search ..................... 73/774, 775, 777, 73/763, 768, 795; 338/2, 5

(56) References Cited

U.S. PATENT DOCUMENTS

| | | | | | |
|---|---|---|---|---|---|
| 3,626,256 A | * | 12/1971 | Brown | ........................ | 257/417 |
| 3,917,981 A | * | 11/1975 | Keen | .......................... | 361/120 |
| 4,422,063 A | * | 12/1983 | Pryor | ............................ | 338/2 |
| 4,511,877 A | * | 4/1985 | Nishikawa et al. | ............ | 338/2 |
| 4,644,621 A | * | 2/1987 | Yates et al. | .................... | 28/247 |
| 4,786,887 A | * | 11/1988 | Bringmann et al. | ........... | 338/2 |
| 5,654,621 A | * | 8/1997 | Seelig | ........................ | 320/108 |
| 6,093,242 A | * | 7/2000 | McKee et al. | ................. | 117/2 |
| 6,132,568 A | * | 10/2000 | Jin et al. | ............... | 204/192.26 |

FOREIGN PATENT DOCUMENTS

| RU | 451 928 | 3/1975 |
|---|---|---|
| RU | 1 820 790 | 3/1995 |
| RU | 1 829 769 | 5/1995 |
| RU | 1 398 573 | 4/1996 |

* cited by examiner

*Primary Examiner*—Max Noori
(74) *Attorney, Agent, or Firm*—Ladas & Parry

(57) ABSTRACT

A strain gauge strip (10a) of the type that can be mechanically applied to a support (1) subject to deformation, is made of Samarium sulphide and provides optimum performance in terms of precision and sensitivity, without being affected by temperature and covering a wide range of deformations that are well suited to commercial application (FIG. 1).

27 Claims, 5 Drawing Sheets

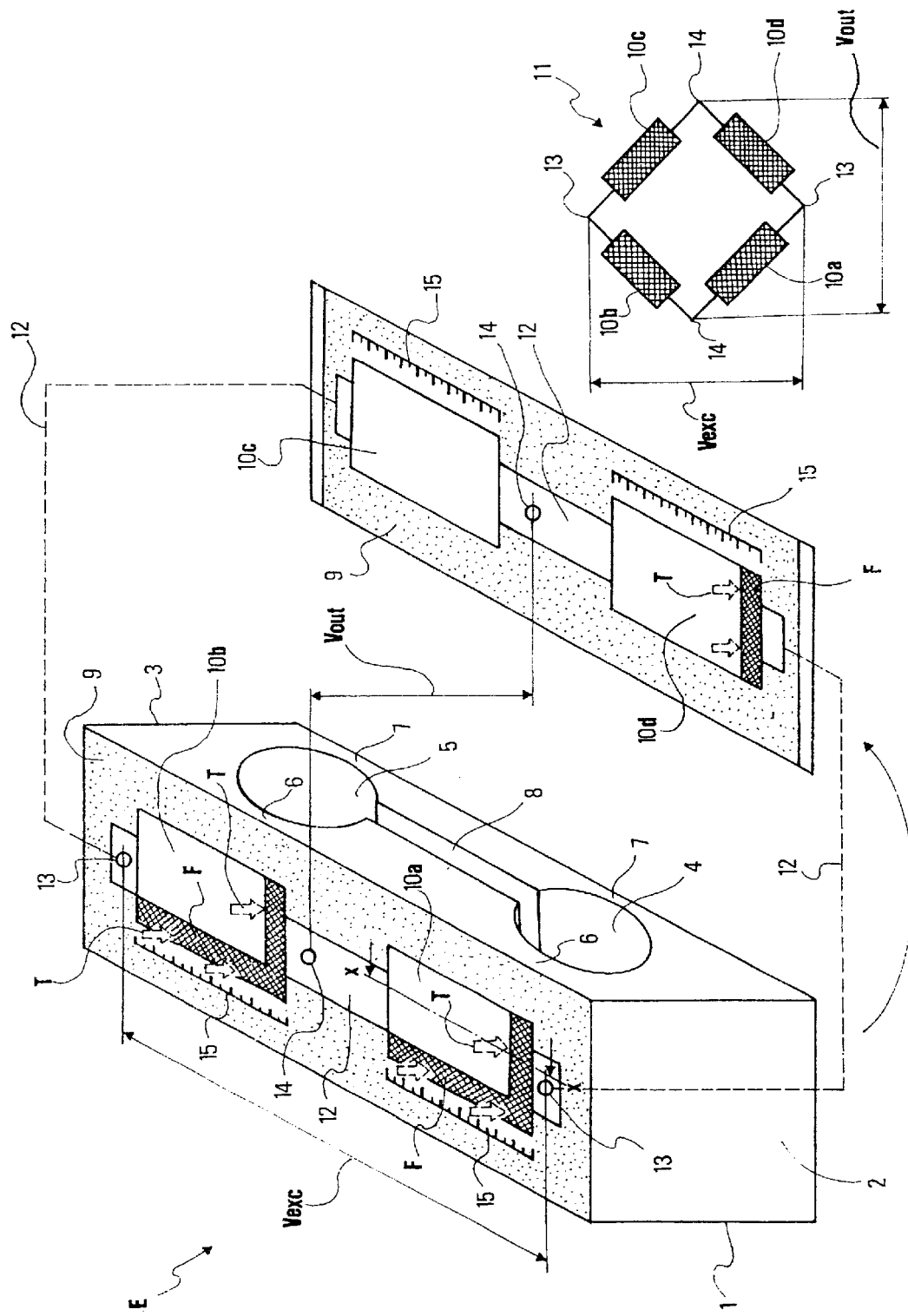

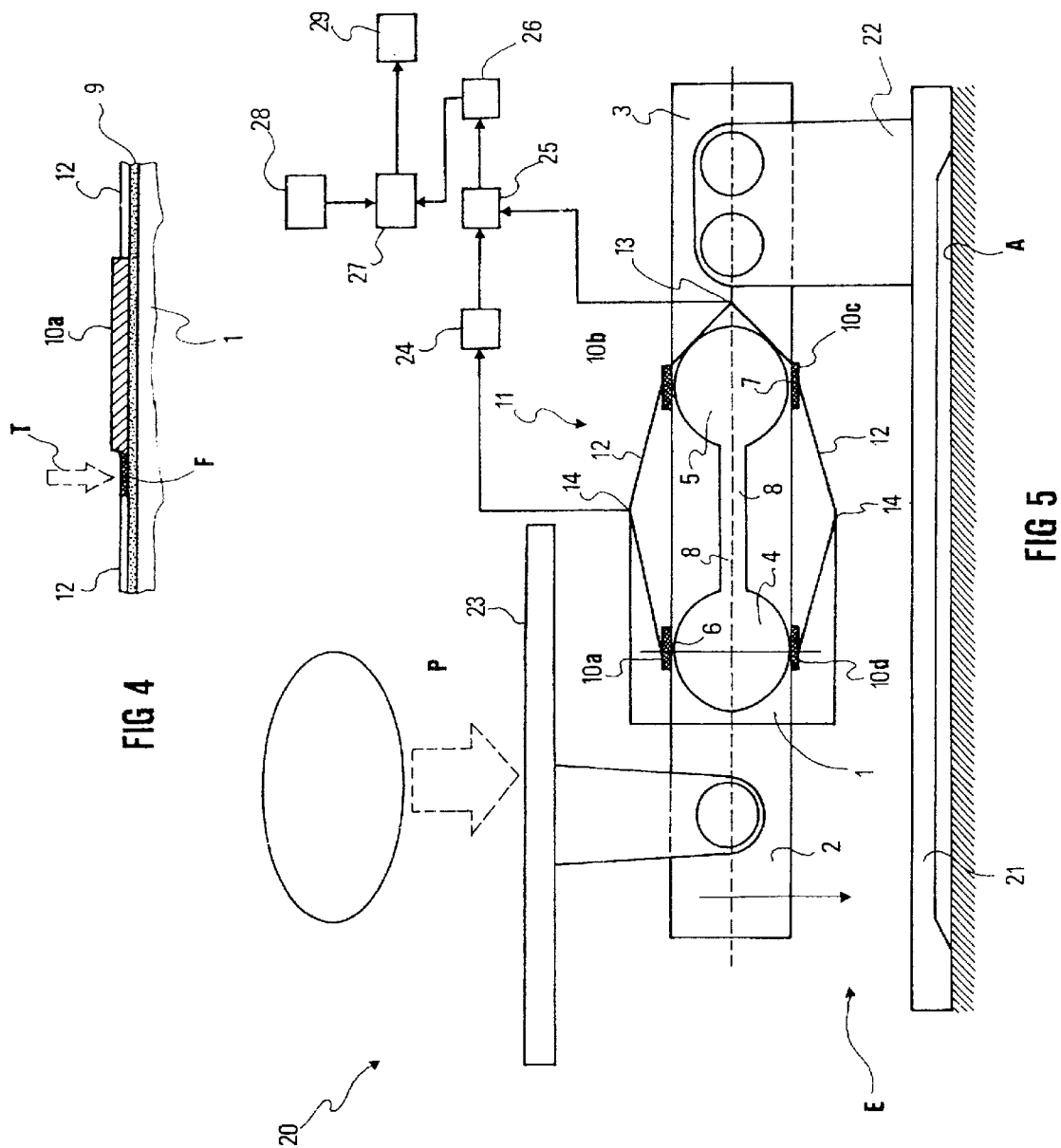

STRAIN GAUGE STRIP AND APPLICATIONS THEREOF

BACKGROUND OF THE INVENTION

1. Field of the Invention

The present invention relates to a strain gauge strip, of the type made of semiconductor material, which can be mechanically applied to a sensitive element subject to deformation. The present invention further relates to applications of said strain gauge strip, in particular to electric strain gauge sensitive elements, measuring instruments and related calibration procedures, pressure scales and transducers. The invention also relates to a method for manufacturing said sensitive element.

2. Description of Related Art

It is a known fact that strain gauge strips are widely used to measure dynamic deformations and, indirectly, to measure forces such as weights, pressures and other forces causing said deformations in a special support. For this purpose they are electrically assembled as a Wheatstone bridge to limit the influence of variations in temperature in the strain gauge strips. The Wheatstone bridge is excited, at two opposite ends, by a reference voltage; the deformation causes a variation in the length of strain gauge strips, with a corresponding variation in the associated electrical resistance value. On the other opposite ends of the bridge a signal is detected, consisting in an electrical voltage substantially corresponding to the deformation that has occurred. This signal represents the force that has caused deformation of the sensitive element.

However, known strips are subject to certain problems, which considerably limit the extent to which they are used. In particular, they generate a signal that does not exceed 2–3 mV/V with respect to the excitation voltage. Furthermore, the electrical resistance they provide is too low, resulting in a considerable dissipation of energy, and they have to be assembled in complex lay-outs that foresee a number of resistors for calibration and control of the influence of temperature. In order to avoid the above problems at least partially, strain gauge strips based on semiconductor materials, e.g. silicon, have been provided, which generally make it possible to obtain a greater output signal. This type of strip, although it is more sensitive, is considerably subject to influences in temperature, so that strips of this kind can be used in extremely controlled conditions, for example in physics laboratories and the like.

Furthermore, a strain gauge strip based on known semiconductor material can be used to measure deformations that fall within very restricted ranges. The most important types of commercial use, for example those connected with determination of weight in the retail sale of goods and products, are therefore precluded for this type of strain gauge strip, as in any other form of use out of doors or in environments that are not thermally conditioned.

SUMMARY OF THE INVENTION

The technical problem at the base of the present invention is that of providing a strain gauge strip that is capable of overcoming the drawbacks mentioned with reference to the prior art. This problem is overcome by a strain gauge strip as described below.

The main advantage of the strain gauge strip according to the present invention lies in the fact that it gives excellent performance in terms of precision and sensitivity, without suffering the influence of temperature and for a wide range of deformations, well suited to commercial use.

DESCRIPTION OF THE DRAWINGS

The present invention will be described in the following with reference to a number of preferred embodiments thereof, given merely as a non-limiting example. Reference will be made to the figures in the enclosed drawings, in which:

FIG. 1 shows an isometric plan view of a sensitive element incorporating strain gauge strips according to the invention;

FIG. 2 shows, in co-operation with FIG. 1, the rear side of the sensitive element;

FIG. 3 shows the electrical wiring diagram for the strain gauge strips of FIG. 1;

FIG. 4 shows a detail, in a cross-section view, of the sensitive element of FIG. 1, taken along line X—X;

FIG. 5 shows a plan elevation view of a balance incorporating the support of FIG. 1;

DETAILED DESCRIPTION OF THE INVENTION

Figure 4A:
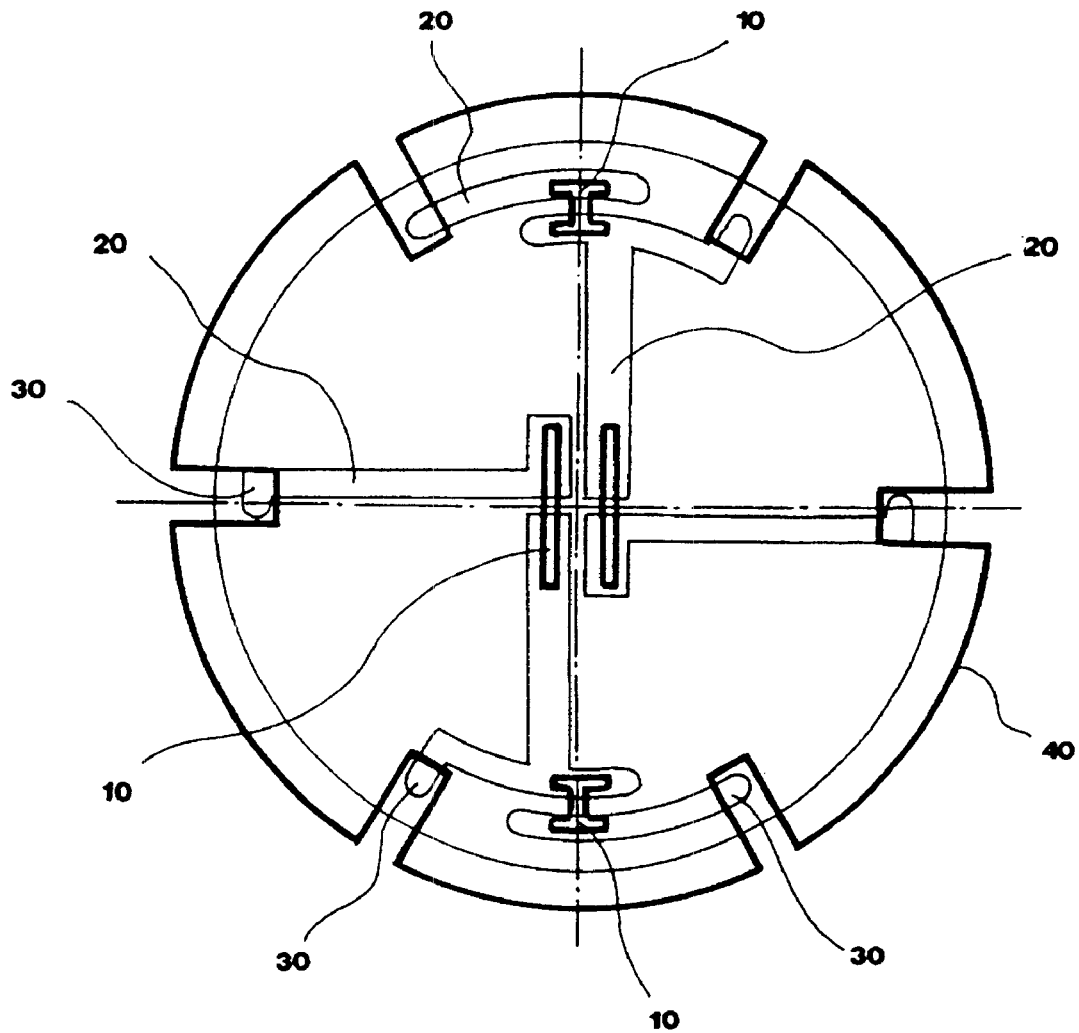
FIG. 4A shows a plan view of a detail of the sensitive element of FIG. 1.

With particular reference to FIG. 1, a sensitive electric strain gauge element is indicated as a whole with E. It is of the type normally incorporated in measurement instruments, such as scales and the like. It comprises an elastically deformable support 1 substantially in the shape of a bending bar, with a rectangular section, which has a free end 2 capable of being placed under stress by a force to be measured, for example a weight, and a fixed end 3.

In this regard, and as will described in greater detail in the following, the support 1 is such that it can be associated with extension sensors of the strain gauge strip type. The support 1 has a pair of first and second through holes, the one nearest to the free end 2 being indicated with 4 and the one nearest to the fixed end 3 being indicated with 5, respectively, which have a circular section. The holes 4, 5 have a parallel axis of symmetry, both perpendicular to the support 1, and are substantially aligned along the support 1 at prescribed distances from the respective ends 2, 3. The diameter of the holes is comparable to the thickness of the support 1 which, in correspondence with each of the holes 4, 5, has a narrow top portion 6 and a narrow bottom portion 7. The four narrow portions all have the same minimum thickness. The support 1 also has a through slot 8 connecting the holes 4, 5. The slot has a parallel development with respect to the support 1, along its longitudinal axis of symmetry. The support 1 described above can be obtained in one piece from a bar of elastic material, for example steel.

As an effect of the geometry of the sensitive element (E), as the support 1 is suitable to be shelf-locked at the fixed end 3, if a force is applied perpendicular to the element E, in correspondence with the free end 2 of the support 1, the latter will bend substantially into the form of an s. The narrow top portion 6 of the first hole 4 and the narrow bottom portion 7 of the second hole 5 undergo the same tension, whereas the narrow bottom portion 7 of the first hole 4 and the narrow top portion 6 of the second hole 5 are subjected to an equivalent compression.

The support 1, which is usually made of metal, is covered with an insulating layer 9 which, in the present embodiment, is of SiO. Said layer 9 can be deposited in situ, for example by means of a known chemical vapour deposition process or by a preferred deposition process that will be described later on. Using this process it is possible to obtain an optimum thickness of the insulating layer 9, which must also remain mechanically anchored to the support 1, at least within the range of possible deformation, compression or tension of the latter, and must consequently deform with it. Said thickness is comprised between 0.5 $\mu$m and 10.0 $\mu$m, and is preferably equal to approximately 5.0 $\mu$m.

In correspondence with the narrow portions 6, 7 and in symmetry with the points of maximum deformation, the support 1 has respective strain gauge strips, the one on the top narrow portion 6 of the first hole 4 being indicated with 10a, the one on the top narrow portion 6 of the second hole 5 being indicated with 10b, the one on the bottom narrow portion of the second hole 5 being indicated with 10c, and the one on the bottom narrow portion of the first hole 4 being indicated with 10d, respectively.

The strain gauge strips 10a–10d are made of a semiconductor material. They are of a kind that will remain anchored to the insulating layer 9 during deformation of the latter. This anchoring causes a corresponding longitudinal deformation of the strip 10a–10d, either stretching or contracting it, which in turn causes a variation in the value of the electrical resistance of the strips 10a–10d. In the strips 10a–10d according to the present invention said semiconductor material comprises Samarium sulphide, hereinafter indicated in brief as $SmS_X$.

Each of the strips 10a–10d has a substantially rectangular shape extending in the direction of the support 1. They are arranged symmetrically at the point of maximum thinness, where the greatest deformation occurs. In other words, the electrical axis of each strip 10a–10d, that is to say the mid point at which the resistance measured from there to one of the ends is the same as the resistance measured from there to the other end, coincides with the mechanical axis of deformation, that is to say the axis along which deformation of each narrow section 6, 7 is symmetrical. The thickness of each strip is micrometric, in particular it can be between 0.05 $\mu$m and 1.0 $\mu$m and for preference, when samarium monosulphide is used, approximately 0.7 $\mu$m. The $SmS_X$ can be deposited as a polycrystalline structure or as a substantially monocrystalline structure, directly onto the insulating layer 9 (FIG. 4). The strips with an $SmS_X$ base are capable of length-wise deformation, which varies their resistance and provides the output signal that is proportional to a so-called gauge factor K, described by:

$$K = \delta R \epsilon * R$$

wherein:
$\delta R$=variation of the gauge resistance
$\epsilon$=strain
R=gauge resistance In the polycrystalline $SmS_X$ strips K can have a value exceeding 50. This value can even reach 100. In the substantially monocrystalline $SmS_X$, strips K has a value of approximately 250, much higher than similar strain gauge strips based on a different semiconductor material; this makes it possible to obtain a measuring precision of 0.005%. In the case of $SmS_X$ this value of K remains substantially unchanged for an extremely wide interval of $\epsilon$, up to $3 \cdot 10^{-3}$, so that the response of each of the strain gauge strips 10a–10d is substantially linear. Furthermore, K does not vary appreciably over an extremely wide range of temperatures, for example between −50° C. and +50° C., so that the strips can be used in unconditioned environments.

Preferably, $SmS_X$ of the present invention is a material having an atomic percent of samarium similar to the atomic percent of the sulfur, i.e. X is approximately equal to or close to 1. Generally, samarium sulfide includes also some impurities of $Sm_3S_4$.

Experiments carried out by the inventors showed that even small variations of X caused a significant variation in the material electrical resistivity and Gauge Factor. In particular, such experimental investigations showed that deposited film of $SmS_X$ reached the maximum sensitivity to strain, and specifically a Gauge Factor comprised in a range of about 50 to 80, when X was varied in a range $0.92 \leq X \leq 0.98$, with the best results under X equal to about 0.965. Moreover, for X=0.965 resistivity changed insignificantly with temperature. In fact, for a temperature T=300 K, resistivity was $\rho = 1.818 \cdot 10^{-3}$ $\Omega$cm, and for a temperature T=1000 K, resistivity was $\rho = 1.812 \cdot 10^{-3}$ $\Omega$cm, i.e. almost equal to the value at T=300 K. Instead, for X=0.988, i.e. outside the preferred range indicated above, at temperature T=300 K resistivity was $\rho = 25.6 \cdot 10^{-3}$ $\Omega$cm, that is greater by an order of magnitude than the corresponding value of $\rho$ for X=0.965.

The experiments carried out by the inventors also showed that this latter kind of $SmS_X$, i.e. $SmS_X$ with X>0.98, is less sensitive to strain: the maximal value of gauge factor obtained was equal to 20. Furthermore, the experimental data obtained by the inventors showed that for the preferred $SmS_X$ with X=0.965 the thickness of the deposited film should be preferably in a range 0.01÷0.05 $\mu$m, and more preferably 0.02 $\mu$m, in order to have nominal resistance near 1000 $\Omega$, for planar film dimensions equal to approximately 0.4 mm×0.4 mm.

Another important property of $SmS_X$ is its long term stability, that depends on material composition (X) and on the protection from humidity and oxidation provided. The experiments carried out by the inventors showed that the preferred $SmS_X$ composition with $0.92 \leq X \leq 0.98$ provides long term stability in temperature range −80° C.$\leq$T$\leq$125° C. up to 0.1%. Furthermore, in order to protect $SmS_X$ from oxidation and humidity, experiments carried out showed that a preferred protection system made by two layers is to be provided, and specifically: a first layer made of SiO deposited by thermal evaporation up to a thickness of about 5 $\mu$m, and a second layer made of a polymer, preferably parylene.

Samarium sulphide SmSx with $0.92 \leq X \leq 0.98$ is synthesised from pure metallic samarium and pure sulphure. The weight of each component in initial mixture is corresponding to atomic percent proportion of the components. The synthesis is consisting of the two phases. The first phase is made inside a quartz container that is sealed under the vacuum/$10^{-2}$ mmHg. The first phase is going under the gradually increasing temperature up to 700° C. during 3–4 days. The second phase of the synthesis is provided inside a tantalum (Ta) container placed inside the quartz reactor in atmosphere of argon (Ar) at the high temperature 1700–1800° C. during one hour.

With reference to FIG. 3, the four strips 10a, 10b, 10c and 10d are electrically connected to one another according to a first Wheatstone bridge arrangement, indicated as a whole with 11. For this purpose each of the strain gauge strips 10a–10d is connected to the adjacent one by means of a conductor strip 12. The conductor stripe 12 is formed by chemical vapour deposition of a layer of conductor material, preferably nickel or cobalt based, that provides a substantially zero contact resistance and can easily be connected to a conductor wire, for example made of copper. Such deposition can be made by a known process or by a preferred process which will be illustrated in the following. It is understood that the connection between the conductor strip 12 and the insulating layer 9 has a considerable mechanical reliability, such as to follow the deformation of the support 1 (FIG. 4).

The aforementioned preferred deposition process of the SiO insulating layer 9, of the SmS$_X$ strips 10$a$–10$d$, of the protection layers thereof and of the conductor strips 12 will now be described.

a) First of all, preferably the metallic surface of support 1 is mechanically polished so that its surface roughness is less than 0.5 µm.

b) Then, SiO deposition is provided on support 1 while maintaining the latter at a constant temperature, in particular equal to approximately 450° C., preferably for a time period lasting about 900 s, with a preferred deposition velocity of about 5.5 nm/s, up to reaching a thickness of the SiO insulating layer of about 5 µm.

c) Then, depositions of the SmSx strain gauge strips 10$a$–10$d$, of the conductor strips 12 and of the protection layer of SiO is provided under decreased temperatures (280° C., 200° C., 350° C.) on the support having the SiO isolation layer.

d) After deposition, preferably a thermal conditioning treatment at the temperature 150° C.–200° C. in the furnace is provided.

The process just described provides excellent properties of electroisolation and mechanical strength. In particular, experiments were carried out wherein isolation resistance (IR) was measured by standard aerospace by applying a DC voltage to all wires of the bridge connected to SmSx strain gauges and to the body of a metallic support. Under 100V DC, an IR value of 10 GΩ was reached, and the SiO isolation layer survived under a 5000 V DC test.

Furthermore, thermal stress testing showed that all sensors having SiO isolation layer had no cracks of SiO at a temperature up to 300° C. With temperature increase, the percentage of the sensors with no cracks in SiO decreased, but at a temperature of 500° C. nearly 20% of the sensors showed no visible cracking in SiO.

It will be appreciated that the above deposition process allows to overcome the known art problems associated with SiO layer fragility even at the ambient temperature.

It will also be appreciated that, by virtue of the use of the deposition process, SmSx strain gauges become one integrated structure with the support, and in such integrated structure strain gauges have the same deformation and temperature that has the support itself, this circumstance is providing significantly higher precision, and in particular high linearity and low hysteresis. In particular, the fact of providing sensitive strips SmS$_X$ by a described deposition process avoids that any temperature gradient ensues during operation at the contact between the support and the strip, which would instead occur where conventional bonding or gluing process be used. Moreover, an integrated strain gauge bridge provides improved dynamic characteristics because the mass of the strain gauges with conductor strips and isolation layer is very small.

Integrated structure of the support with strain gauges provides also advantages for the manufacturing process. In particular, always according to a preferred embodiment of the deposition process, SmSx strips are deposited onto support 1 by means of very thin laser-cut masks, preferably according to the design shown in FIG. 4A. With reference to said FIG. 4A, 10 denotes SmSx strain gauges, 20 conductor strips, in particular made of Ni, 30 electrical contact places and 40 the protection layers. All other layers are deposited onto the SiO insulating layer and covered by the SiO protection layer 40, except for contact positions 50. In case of a sensor pressure membrane as that of FIG. 6, instead that of a support as the one depicted in FIG. 1, all depositions are provided on one side of the membrane.

The use of laser-cut masks allows obtaining SmSx strips of very small planar dimensions, in the order of 0.1 mm×1.0 mm and positioned precisely, thus allowing the manufacture of miniature sensors with high repeatability. Furthermore, such masks provide a perfect contact with the surface on which deposition is provided. Moreover, experiments carried out by the inventors showed that the use of a laser-cut mask in conjunction with the deposition process described above avoids the need for any etching of SmSx in order to tune strain gauge sensitivity to temperature. Etching processes, in fact, have the disadvantage of leaving small traces of the etching material, which cause the instability of material in long term.

The first bridge 11, as shown in FIGS. 1 to 3, is subjected to an excitation voltage $V_{exc}$ at two opposite ends, known as excitation ends and indicated with 13, in particular the ones between 10$b$ and 10$c$ and between 10$a$ and 10$d$. When the element E is subjected to stress that causes it to bend into the shape of an S, as described above, the strips 10$a$ and 10$c$ are elongated, whereas the strips 10$b$ and 10$d$ are compressed. In static conditions, with zero deformation, the bridge 11 is perfectly balanced, and between the other opposite ends, known as the detection ends and indicated with 14, in particular the ends between 10$a$ and 10$b$ and between 10$c$ and 10$d$, there is no voltage.

When deformation takes place, the bridge is electrically unbalanced. At the detection ends 14 an electric signal is generated, consisting in a voltage $V_{out}$, corresponding to the deformation and to the force to which the support 1 has been subjected and which has caused the deformation. The output signal $V_{out}$ is significantly high, in the order of approximately 50 mV/V with respect to the excitation voltage $V_{exc}$. The overall resistance of the strain gauge strips 10$a$–10$d$ can be effectively varied within a range comprised between 200 Ω and 500000 Ω, which makes it possible to decrease the dissipated energy and to receive a very high output signal even without amplification. The decreased energy consumption makes it possible to use normal disposable and/or rechargeable batteries to excite the Wheatstone bridge. Furthermore, the sensitive element E continues to give a constant operating quality even when subjected to intense nuclear type radiation, for example γ rays of an intensity equivalent to $10^{10}$ Röentgen.

As well as the above mentioned physical characteristics, the sensitive element E described above can be advantageously subjected to a calibration procedure, as will be described in greater detail in the following. A thin layer of SmS-based semiconductor material, either polycrystalline or monocrystalline, can be subjected to a conversion that generates a phase acting substantially like a metal, that is to say in which the electrical resistance of the converted material is typical of a metal (very low) rather than typical of a semiconductor.

It has been observed that SmS is subject to effective conversion if locally subjected to a pressure even lower than 30 kbar, that is to say approximately 20 kbar, the pressure obtained by manual rubbing. This effect can be obtained advantageously using pressures of less than 10 kbar. The reason for this physical characteristic lies in the fact that for said local pressure values there is an increase in the density of electrons, which are responsible for the phenomenon of electrical conduction up to $1.8 \cdot 10^{22}$ cm$^{-3}$, the typical value for metals.

For these reasons, the following procedure is used. After positioning the fixed end 3 of the sensitive element E on a special spindle, a known calibration force is applied, for example a weight or a known flexural force, at the free end 2. Due to this force the support 1 is deformed. A given electrical signal is generated, which can be conveniently measured and compared with an electrical reference signal. After considering the difference between the two signals, a change in phase is created, in one of the strips 10a–10d or on more than one of said strips, as described above, that is to say from a substantially polycrystalline or monocrystalline phase to a phase acting like a metal. This change is carried out by exerting a pre-determined pressure T on a localised area F. The pre-determined pressure T is exerted by rubbing, and has a value of less than 30 kbar, preferably of approximately 20 kbar. The chosen localised area, due to compression, takes on a thickness equivalent to approximately 10% of the original thickness. The position and dimensions of the localised section F can be carefully chosen with reference to graduated lines 15 at the edges of the strips 10a–10d.

As well as collimating the calibration signal and the reference signal, the change can be performed advantageously in such a way that the electrical axis of the single strips 10a–10d always coincides with the respective mechanical axes of deformation. This change, in the case of SmS, is particularly simple. In fact the crystalline phase and the metal phase have a totally different colour, golden for the former and dark, brownish for the latter.

When operating on more than one strip it is also possible to balance any unbalance caused by corrections to a single strip. Further, the change of phase is such that a virtually zero resistance is maintained at the points of connection between strain gauge strips 10a–10d and conductor strips 12. Advantageously the calibration is carried out in relation to a specific temperature. For this purpose the operations described above can be carried out in controlled temperature conditions in a suitably conditioned environment.

With reference to FIG. 5, a scale 20 will now be described, incorporating the sensitive element 1 described above. Parts that are the same or have the same function as those illustrated in precedence are given the same reference number. The scale 20 comprise a fixed frame 21, capable of being arranged on a support surface A, having shelf-type engagement means 22 connected to the fixed end 3 of the sensitive element E. On the opposite free end 2 a load platform 23 is rigidly fixed, said platform being of the type suitable to hold a weight P to be measured.

In the present embodiment, determination of the exact weight is accompanied by determination of the price of sale for the product of weight P. The scale 20 have, on the element E, strain gauge strips 10a–10d as described above. These have already been calibrated according to the process of the invention.

The strips 10a–10d are electrically connected by means of a Wheatstone bridge 11. At the excitation ends 13 an excitation voltage $V_{exc}$ is applied. Once the weight P has been positioned on the plate 23, the element E undergoes an elastic type deformation. The strips 10a and 10c are subjected to elongation, whereas the strips 10b and 10d are subjected to compression. The first bridge 11 is thus unbalanced, and an electrical signal Vout is generated, substantially corresponding to the weight P. The signal Vout is received by an amplifier 24, which transmits it to a comparator 25, which also receives the excitation voltage Vexc. The resulting signal is passed to an analog-to-digital converter 26, which is in turn connected to a microprocessor 27. The microprocessor 27 receives data, for example the price per kilo or type of goods, from a keyboard 28 and generates output values, such as the price of sale, weight detected and the like, which can be read from a display 29 or printed on a receipt.

Figure 6:
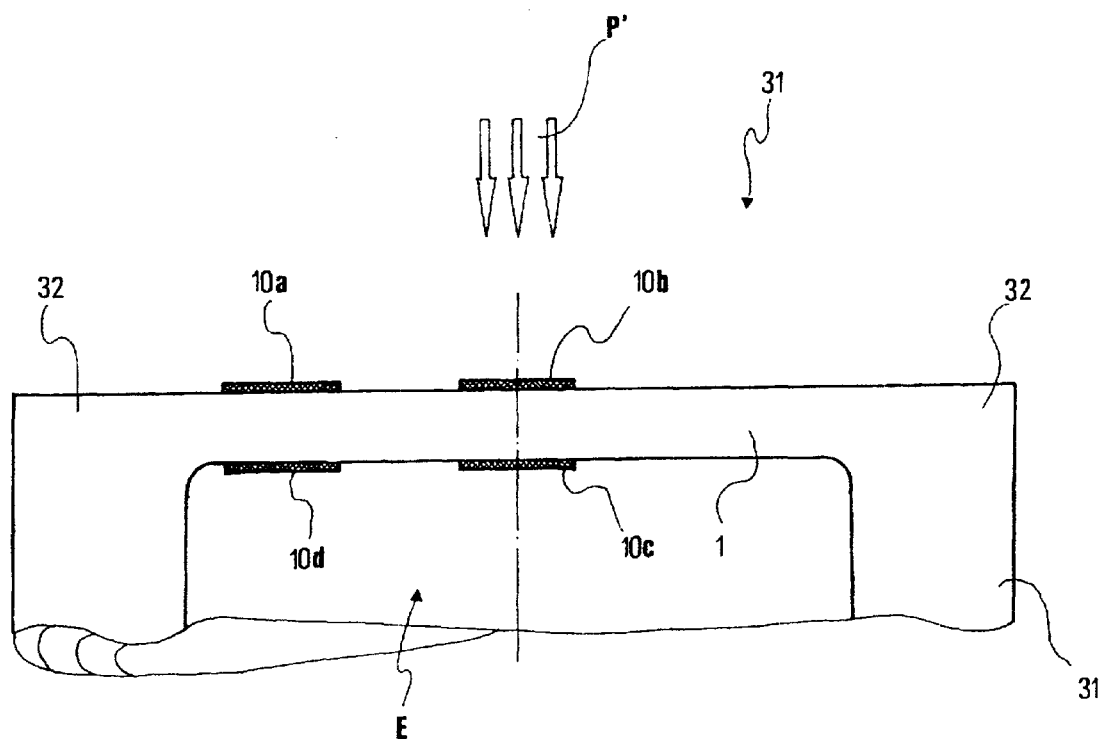
FIG. 6 shows a plan elevation view of a pressure transducer incorporating strain gauge strips according to the present invention.

The same inventive concept can also be applied on a different type of measurement instrument, for example a pressure transducer, indicated with 30 in FIG. 6, capable of measuring a static pressure P' in a fluid such as water or air. In said transducer 30 the sensitive element E foresees an elastically deformable membrane-type support 1, in the shape of the end surface of a stainless steel cylinder 31. Inside the cylinder 31, which is partially shown in the figure, there is a known pressure; in effect the pressure measured is a differential or relative pressure. An insulating layer of glass or mica, not shown in FIG. 6, is provided on both surfaces of the membrane 1, to which the strain gauge strips 10a–10d can be anchored. The thickness of the insulating layer is advantageously between approximately 10 $\mu$m and 30 $\mu$m.

The SmS strain gauge strips 10a–10d are anchored to said layer of mica or glass by a chemical vapour deposition process. The glass or mica layer, together with the strips 10a–10d, is bonded to the metal membrane 1. The SmS strain gauge strips 10a–10d can be also deposited on the insulation layer of SiO that can be deposited on the metal membrane 1 in a similar manner that was already described above for the sensitive element E of the scale 20.

The strain gauge strips 10a and 10d are applied to the insulating layer and, following application of the latter to the membrane 1, they are arranged close to the edge 32 of the cylinder 21, that is to say in the point of maximum deformation; the strip 10a is subjected to elongation as a result of the pressure P', whereas the strip 10d is subjected to compression. The strain gauge strips 10b and 10c, on the other hand, are positioned in correspondence with the axis C of the cylinder, at the point of maximum curvature of the membrane 1. The strips 10a–10d are connected by means of a Wheatstone bridge as described above; the electrical signal corresponding to the pressure P' is generated and treated in the same way used for the scale 20. The calibration procedure described above can also be advantageously used for the transducer 30.

It will be appreciated that in these type of sensors the fact that SmSx strain gauges become one integrated structure with the support, by virtue of the preferred deposition process described above, is further emphasized by the fact that the thickness of the isolation layer between SmSx strain gauges and the support is negligible in comparison with thickness of the pressure gauge membrane or load cell element.

Figure 7:
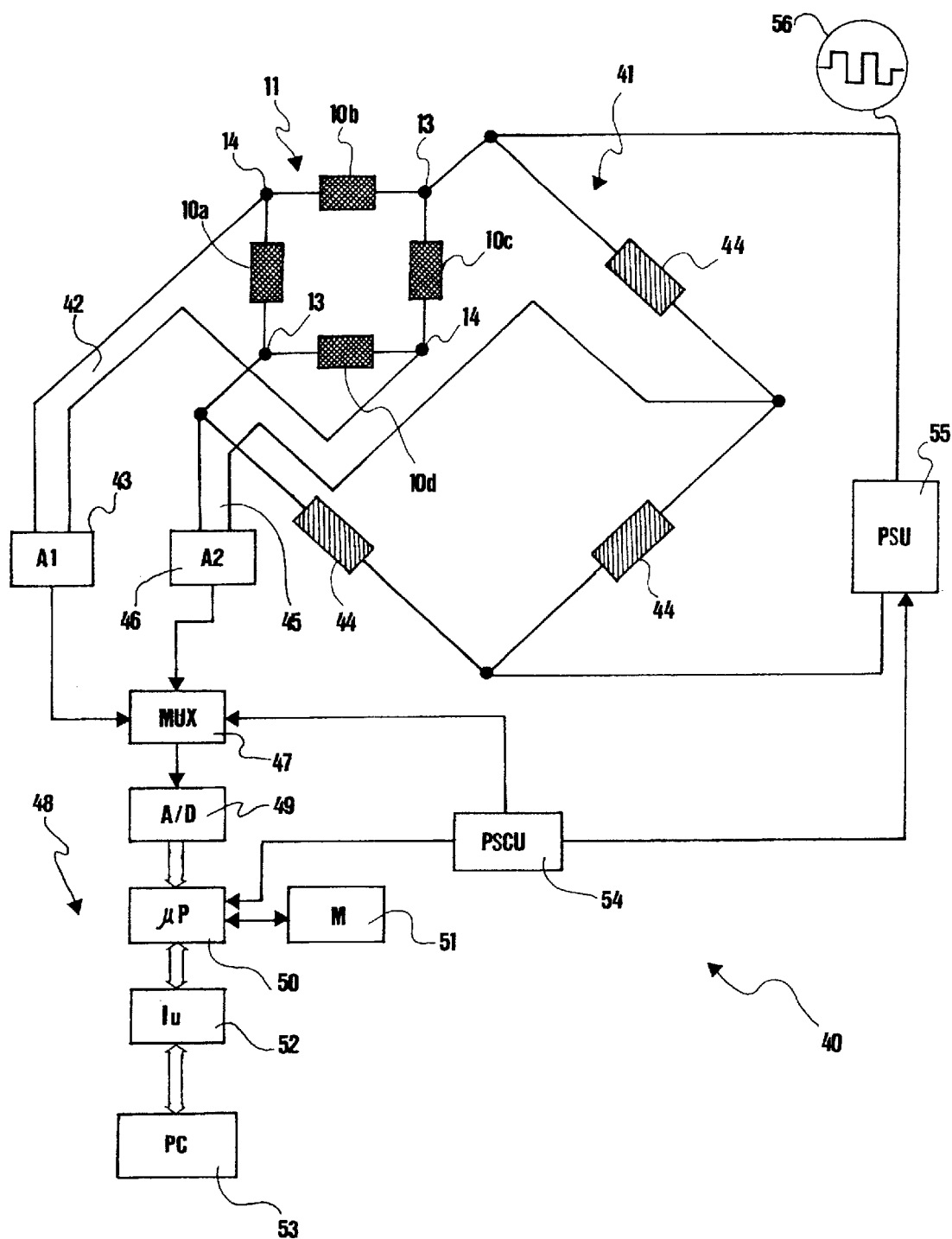
FIG. 7 shows a schematic view of an arrangement of the sensitive element.

In scales or pressure transducers as described above, in order to provide the resistance thermal variation of the first bridge 11 with a complete compensation, the bridge 11 itself is connected to an accentuation and measurement unit 40 which is shown in FIG. 7. Such unit 40 comprises a second Wheatstone bridge arrangement 41 wherein said first bridge 11 is one of its four shoulders.

A first channel 42 of the measurement unit 40, which is sensitive to load or pressure, is connected to the free diagonal of the first bridge 11. Said channel 42 comprises a first measuring amplifier 43. The other shoulders of the second and external bridge 41 are resistors 44, which are precise having a high stability to temperature variation. The resistors 44 have the same value of resistance that the first bridge 11.

A temperature sensitive channel 45 of the measurement unit 40 is connected to the free ends of a diagonal of the external bridge 41. Said channel 45 comprises a second measuring amplifier 46. Both amplifiers 43, 46 are connected to a multiplexer 47 which is linked to a line 48 comprising an A/D converter 49, a microprocessor 50 which is connected to a memory 51, an interface 52 and a computer unit 53. The multiplexer 47 and the microprocessor 50 are connected to a power supply control unit 54. An excitation unit 55, i.e. a power supply unit, is connected to the free ends of the other diagonal of the external bridge 41, whereby an excitation signal 56 is provided. The excitation unit is connected to the power supply control unit 54.

During the calibration procedure, the sensitive element E is heated up to a prescribed value of temperature in an unloaded condition. The thermal variation of the first bridge is thereby recorded. During the successive measurements such characteristic can be used for corrections.

As well as the advantages mentioned above, the strain gauge strip described makes it possible to construct sensitive elements which, in relation to the working temperature, geometry of the elastic support and flexural parameters, is particularly easy to calibrate and in which the coincidence between the electrical axis of each strip and the corresponding mechanical axis of deformation associated therewith can be maintained. Obviously, calibration is also made easy by the fact that it is associated with rapid detection of the change in characteristics of each single strip, indicated by the change in colour thereof.

The strain gauge strip and applications thereof described above can be subjected to further modifications and adjustments by a person skilled in the art, in order to satisfy additional needs and requirements, without departing from the scope of protection of the present invention, as defined in the attached claims.

What is claimed is:

1. A sensitive electric strain gauge element for measuring instruments, comprising one or more strain gauge strips made of semiconductor material, connected to an elastically deformable support and electrically connected to one another to generate an electric signal corresponding to said force, said electric strain gauge further comprising an insulating layer located between the support and the strain gauge strips, wherein said semiconductor material is Samarium sulphide $SmS_X$ with X in a range $0.92 \leq X \leq 0.98$, such that causing a change of material resistance under strain, and providing a substantially constant value of gauge factor for an extremely wide interval of strains, and further providing for a low sensitivity to temperature change.

2. The sensitive element according to claim 1, where X is approximately equal to 0.965.

3. The sensitive element according to claim 2, wherein said one or more strain gauge strips have a thickness between 0.01 µm and 0.05 µm.

4. The sensitive element according to claim 3, wherein said thickness is approximately 0.02 µm.

5. The sensitive element according to claim 1, comprising a two-layer protection deposited onto said one or more strain gauge strips.

6. The sensitive element according to claim 5, wherein said two-layer protection comprises a first layer made of SiO and a second layer made of a polymer.

7. The sensitive element according to claim 6, wherein said SiO layer is deposited by thermal evaporation to a thickness of about 5 µm.

8. The sensitive element according to claim 6, wherein said polymer layer is made of parylene.

9. The sensitive element according to claim 1, wherein said one or more strain gauge strips are made of policrystalline samarium sulphide.

10. The sensitive element according to claim 1, wherein said one or more strain gauge strips are made of monocrystalline samarium sulphide.

11. The sensitive element according to claim 1, which has four strain gauge strips electrically assembled to form a first Wheatstone bridge arrangement and which comprises a second Wheatstone bridge arrangement having shoulders, wherein said first Wheatstone bridge arrangement is one of said shoulders and the other of said shoulders are resistors having the same value of resistance of the first Wheatstone bridge arrangement, providing that an excitation unit is connected to the free ends of one diagonal of the second Wheatstone bridge arrangement, a load or pressure sensitive channel is connected to the free diagonal of the first Wheatstone bridge arrangement and a temperature sensitive channel is connected to the free ends of the other diagonal of the second Wheatstone arrangement.

12. The sensitive element according to claim 1, wherein said insulating layer is made of SiO.

13. The sensitive element according to claim 12, wherein the SiO is deposited by means of a chemical vapour deposition process.

14. The sensitive element according to claim 1, comprising a plurality of strain gauge strips electrically connected to one another to generate an electrical signal corresponding to a force applied to said element, wherein the strain gauge strips are electrically assembled by means of conductor strips formed by means of Nickel and Cobalt deposition.

15. The sensitive element according to claim 1, wherein said support has a mechanical axis of deformation and said strain gauge strips are arranged in such a way that their electrical axis coincides with the mechanical axis of deformation of the support.

16. A method for manufacturing a sensitive element according to claim 1, comprising the steps of:
    polishing the support so that its surface roughness is less than 0.5 µm;
    depositing a SiO insulating layer onto the support while maintaining the latter at a constant temperature up to reaching a thickness of about 5 µm;
    depositing one or more strain gauge strips made of samarium sulphide $SmS_X$ under decreased temperatures on the support having the SiO isolation layer; and
    depositing one or more conducting strips contacting said one or more strain gauge strips.

17. The method of claim 16, wherein said constant temperature when depositing the SiO insulating layer is approximately 450° C.

18. The method of claim 16, wherein said step of depositing the SiO insulating layer provides a deposition velocity of about 5.5 nm/s.

19. The method of claim 16, comprising a further step of depositing a two-layer protection onto said one or more strain gauge strips.

20. The method of claim 16, comprising a further step of applying a thermal conditioning treatment at a temperature in a range between about 150° C. and about 200° C.

21. A process for calibration of the sensitive element according to claim 16, which comprises the following operations: applying a calibration force to said measurement instrument; observing the electrical signal generated; causing, in one or more of said strain gauge strips, a change in phase from a substantially crystalline phase to a substantially metallic phase, by exerting a pre-determined pressure on a localised section of said one or more strain gauge strips, said localised section having a size and position determined by the difference between said electrical signal generated and a reference signal.

22. The calibration process according to claim 21, wherein said predetermined pressure has a value not exceeding 30 kbar.

23. The calibration process according to claim 22, wherein said predetermined pressure is exerted by rubbing.

24. The calibration according to claim 21, wherein, when said predetermined pressure is exerted, the thickness of the strain gauge strip is reduced in said localised section until it is 10% of the original thickness.

25. The calibration process according to claim 24, wherein, when said predetermined pressure is exerted, the colour of the strain gauge strip is changed from golden to dark brown in said localised section.

26. The calibration according to claim 24, wherein said operations are performed in controlled temperature conditions.

27. Scale comprising a load cell, capable of receiving objects to be weighed, mechanically connected to one or more sensitive elements according to claim 1.

* * * * *